US006669565B2

(12) United States Patent
Liegey

(10) Patent No.: US 6,669,565 B2
(45) Date of Patent: Dec. 30, 2003

(54) METHOD OF CONDUCTING A FANTASY SPORTS GAME

(75) Inventor: Greg Liegey, York, PA (US)

(73) Assignee: Fantasy Sports, Inc., Boca Raton, FL (US)

( * ) Notice: Subject to any disclaimer, the term of this patent is extended or adjusted under 35 U.S.C. 154(b) by 296 days.

(21) Appl. No.: 09/776,786

(22) Filed: Feb. 5, 2001

(65) Prior Publication Data

US 2002/0107590 A1 Aug. 8, 2002

(51) Int. Cl.[7] .......................... A63F 13/00; A63F 9/24; G06F 17/00; G06F 19/00

(52) U.S. Cl. ................................ 463/42; 463/1; 463/9; 273/439; 273/85 R; 273/88; 273/94; 700/91; 700/92; 700/93; 379/92; 379/93; 379/95

(58) Field of Search .......................... 463/1-10, 40-42; 273/93-95, 55 R, 55 AC, 85 R, 439, 88; 379/93, 95; 364/410; 700/91-93

(56) References Cited

U.S. PATENT DOCUMENTS

| | | | | | |
|---|---|---|---|---|---|
| 4,918,603 | A | * | 4/1990 | Hughes et al. | 463/4 |
| 5,018,736 | A | * | 5/1991 | Pearson et al. | 463/29 |
| 5,083,271 | A | | 1/1992 | Thacher et al. | 364/411 |
| 5,830,069 | A | * | 11/1998 | Soltesz et al. | 463/42 |
| 5,860,862 | A | * | 1/1999 | Junkin | 463/40 |
| 6,039,648 | A | | 3/2000 | Guinn et al. | 463/16 |
| 6,092,806 | A | | 7/2000 | Follis | 273/138.1 |
| 6,135,881 | A | * | 10/2000 | Abbott et al. | 463/3 |
| 6,292,706 | B1 | * | 9/2001 | Birch et al. | 700/91 |
| 6,319,123 | B1 | * | 11/2001 | Paludi | 463/20 |
| 6,347,086 | B1 | * | 2/2002 | Strachan | 370/389 |
| 6,371,855 | B1 | * | 4/2002 | Gavriloff | 463/42 |
| 6,434,398 | B1 | * | 8/2002 | Inselberg | 455/517 |

OTHER PUBLICATIONS

Fantasy Cup College Basketball Tournament Challenge [online] Dec. 31, 1998 [retrieved on Oct. 10, 2002]. Retrieved from the internet: <URL: http://cbasketball.fantasycup.com/how_to_win.html>.*
http://www.fantasynascar.com/onerace/rulebook.html.
http://games.espn.go.com/cgi/fba/request.dll-?FRONTPAGE.
http://ww3.sportsline.com/u/fantasy/hoops/index.html.
http://fantasy.sportingnews.com/baseball.
http://www.sandbox.com.

* cited by examiner

*Primary Examiner*—Teresa Walberg
*Assistant Examiner*—Robert Mendoza
(74) *Attorney, Agent, or Firm*—Robert A. Koons, Jr.; Daniel Mark Maloney; Buchanan Ingersoll P.C.

(57) ABSTRACT

A method of conducting a fantasy sports game is provided which includes increasing the points available for winning picks in later rounds and allowing participants to trade teams. The points awarded for picking the winning team may also be based on the Round of the tournament and the "seed" of the winning team. The number of trades available to participants may be decreased in later rounds, or discontinued in the final round. The game is also applicable to Internet based fantasy sports competitions.

13 Claims, 6 Drawing Sheets

METHOD OF CONDUCTING A FANTASY SPORTS GAME

FIELD OF THE INVENTION

The present invention relates to fantasy sports games. In particular, the present invention relates to fantasy games based on seed-based tournaments which involve selecting winners for each round of the tournament.

BACKGROUND OF THE INVENTION

Gaming and wagering on ongoing tournaments by tournament fans generally falls within three distinct categories. First, fans often pick which tournament participant or team will win the overall championship. Second, fans often pick the winner or winners of the individual rounds, choosing either set of individual teams or a series of teams linked in what is commonly referred to as a parlay. If each team wins, the fan wins. Third, fans will choose winners for each game in the entire tournament, often filling in a chart which outlines the tournament course. Finally, in states with legalized gambling, fans often place wagers according to the above categories. In other states, "office pools" also exist, where individuals compete by filling out a tournament chart as above, and "pool" participation fees as a reward for the best guesses. The winner of the pool is usually the individual with the most wins.

At present, one of the most popular tournaments for this type of gaming is the NCAA™ division I basketball tournament, which includes 64 college basketball teams selected from the top teams in the United States. The teams are divided into four divisions of 16 teams, and each team is given a rank or a "seed" based on their win loss record, the difficulty of their season, and their perceived chance of winning the tournament. The tournament is a knockout or single elimination tournament, and after the first round, 32 teams are eliminated and 32 teams remain. After the second round, 16 teams are eliminated and 16 remain. This continues until one team remains as the NCAA™ division I champion.

Current fantasy games based upon tournaments like the NCAA™ tournaments have one common failing. If a fan chooses poorly in the initial rounds of the tournament, enough of the teams they have chosen are eliminated, and they may be statistically barred from winning the game. Such fans typically lose interest after the first or second round. Variants of this situation occur when fans lose all of their teams in a particular division, lose all of the teams that they have chosen for the finals, semi-finals or championship rounds, or simply lose the team with which they most strongly identify, through a shared location, history or background with the team.

For these and other reasons, fans can often lose interest in the ongoing tournament, and also lose interest in the ongoing fantasy game based on the tournament. Where the game is played via an on-line service or content provider, i.e., a gaming site, such a provider often earns revenues from advertising and "hits" upon the game site as fans check the progress of their selection. Such sites often have related content, such as different competitive games, or gambling where legal, and fans who more frequently check the status of their fantasy game are thus more likely to utilize the other content provided by the site.

Thus there is a problem for retaining fan interest in the later rounds of ongoing fantasy sports games based on ongoing tournaments, such that fans who lose their chosen teams, commonly referred to as "picks," in early rounds of the ongoing tournament also lose interest in the ongoing fantasy game. In the Internet gaming scenario, this loss of fan interest also represents a loss of advertising and participation fee revenues.

SUMMARY

Thus, the present invention relates to a method for conducting a seed-based fantasy sports game which increases game participant's interest in the later rounds of the game and tournament by allowing game participants to trade their teams, and by increasing the points available in later rounds. The method includes the steps of: selecting a plurality of teams from the field of an ongoing sports tournament; determining a result of the ongoing tournament; calculating a point total for the fantasy game participant based on the results of the round of competition; allowing a number of trades of the eliminated competitors for remaining competitors; and eventually determining the winner of the fantasy sports game after completion of the ongoing tournament.

In one embodiment of the invention, the method includes awarding bonus points to player(s) who complete the game without trading any of their teams receive bonus points, or to the player(s) who complete the game trading the fewest teams. This step provides an incentive and reward for players who make their best picks early in the tournament.

In one embodiment of the invention, the method includes reducing the number of trades allowed following each round of the tournament. Trading may also be reduced by allowing trading only during a limited number of rounds in the tournament, i.e., fewer rounds than the total number of rounds in the tournament.

In one embodiment of the invention, the fantasy game uses a series of graphical interfaces provided on an Internet web page.

DETAILED DESCRIPTION OF THE INVENTION

As used herein, the following terms are defined by their common usage. A tournament bracket is defined as the chart which depicts the teams which have played and will play in the tournament at any given moment. The round of a tournament (Round One, Round Two, etc.) is defined as the level of the game being played, i.e., all four semifinal games are played in the semi-final round, and the first games of the tournament are played in Round One of the tournament. Also, an individual's pick or picks are defined as the team or teams they have selected to win in an individual game or round.

Figure 1:
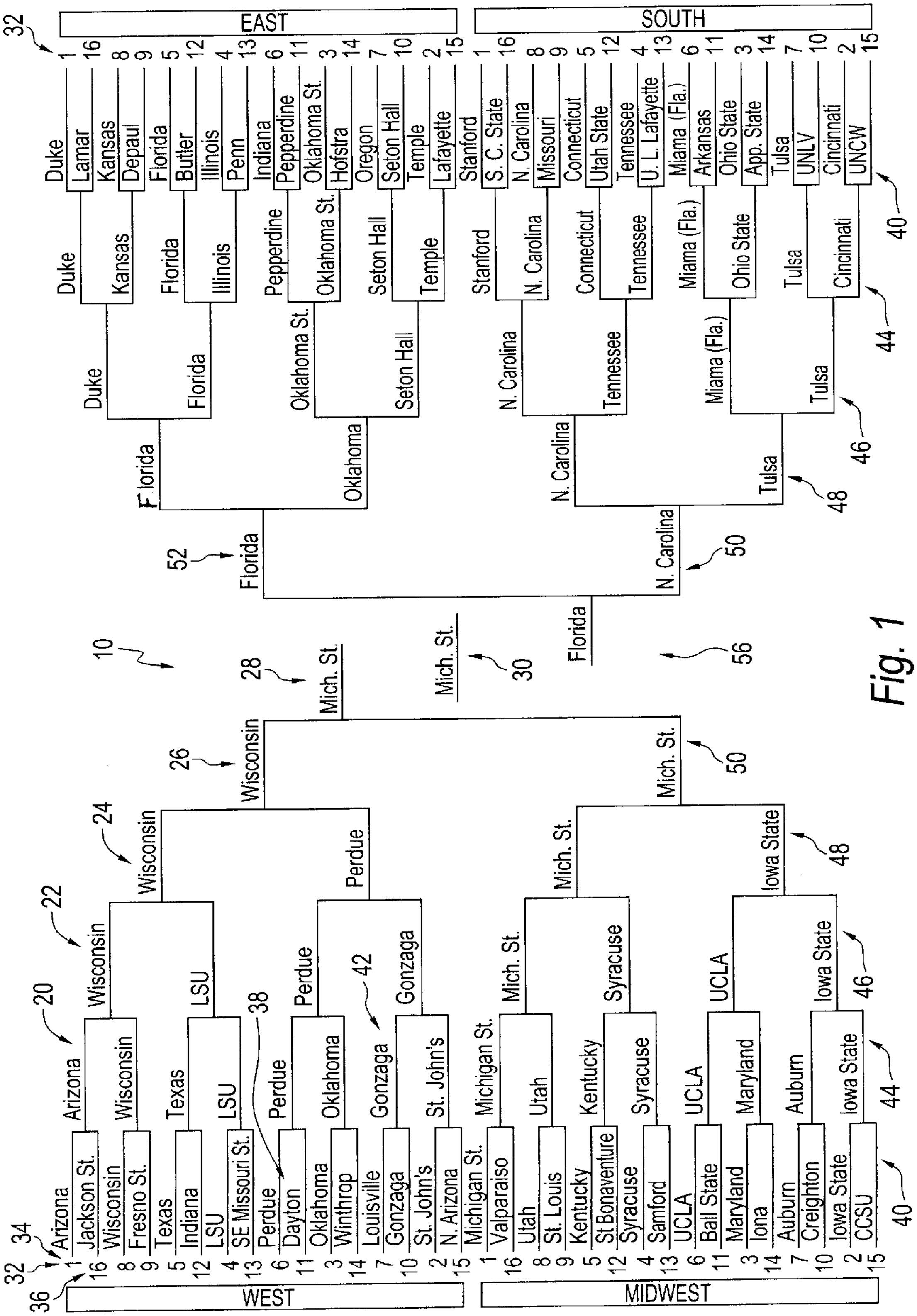
FIG. 1 depicts a hypothetical tournament bracket showing the initial field for the NCAA™ division I college basketball tournament, and an individual's picks from the field including the tournament winner.
Figure 2A:
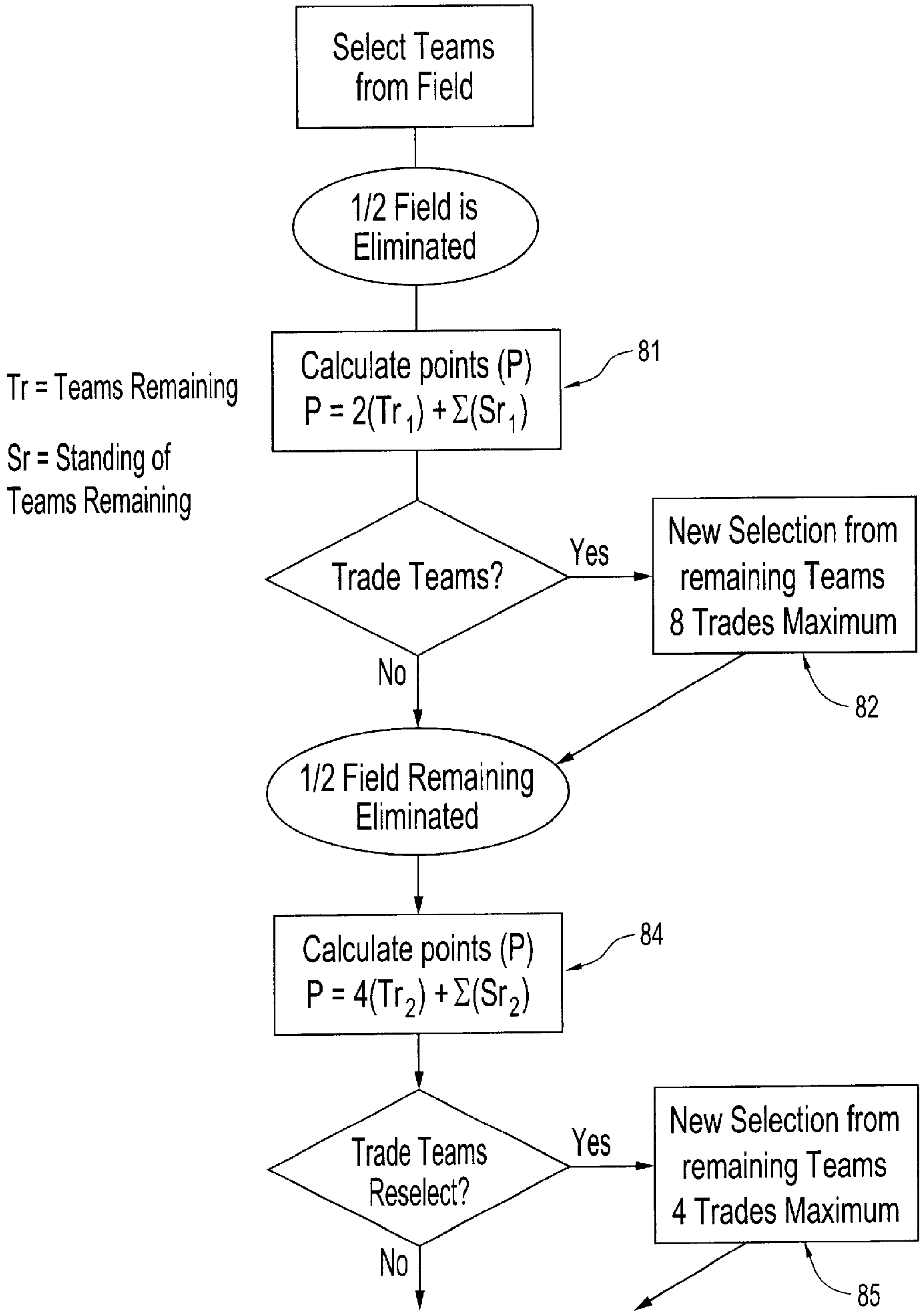
FIG. 2 depicts the game engine as applied to the NCAA™ division I basketball tournament, simplified into a flow diagram.
Figure 2B:
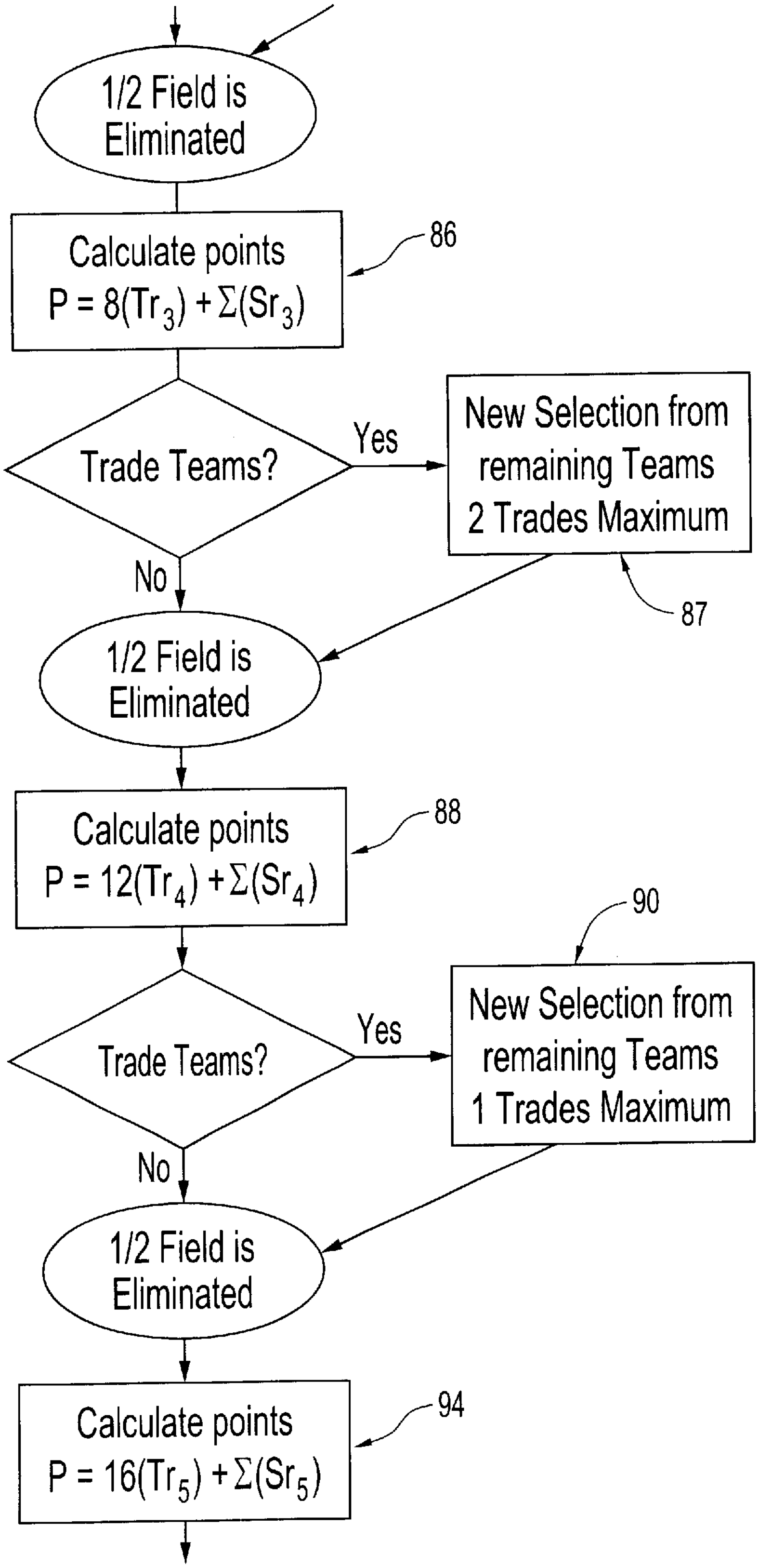
Figure 2C:
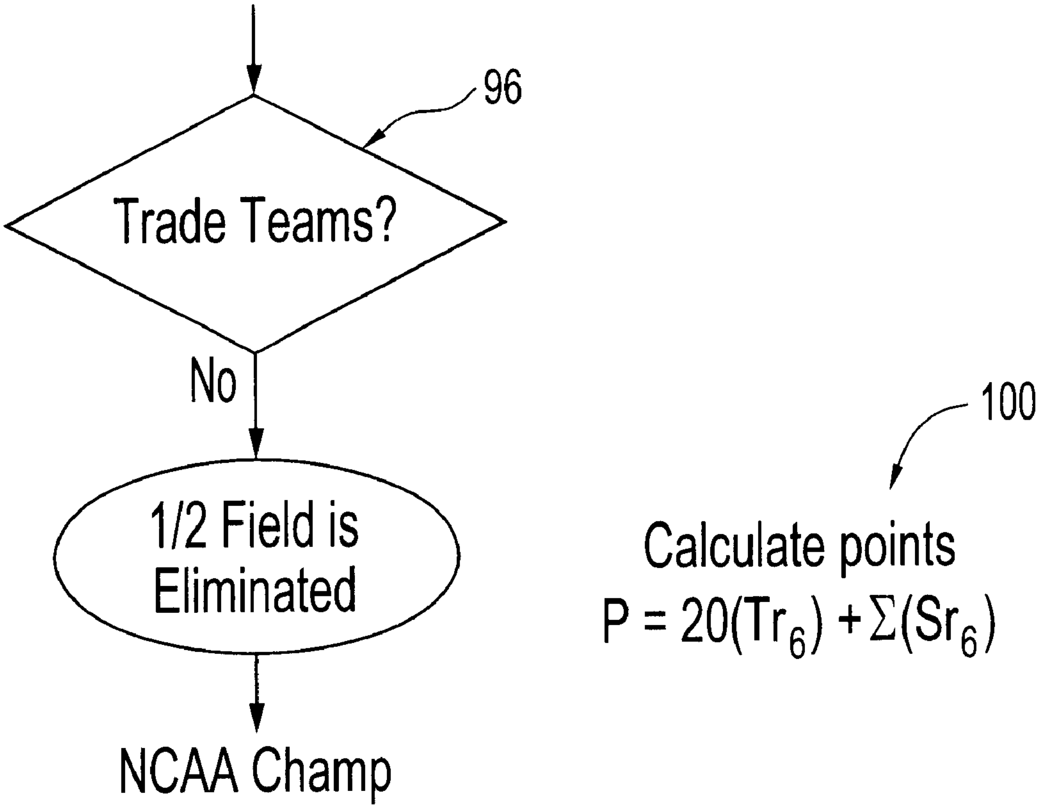
Figure 3:
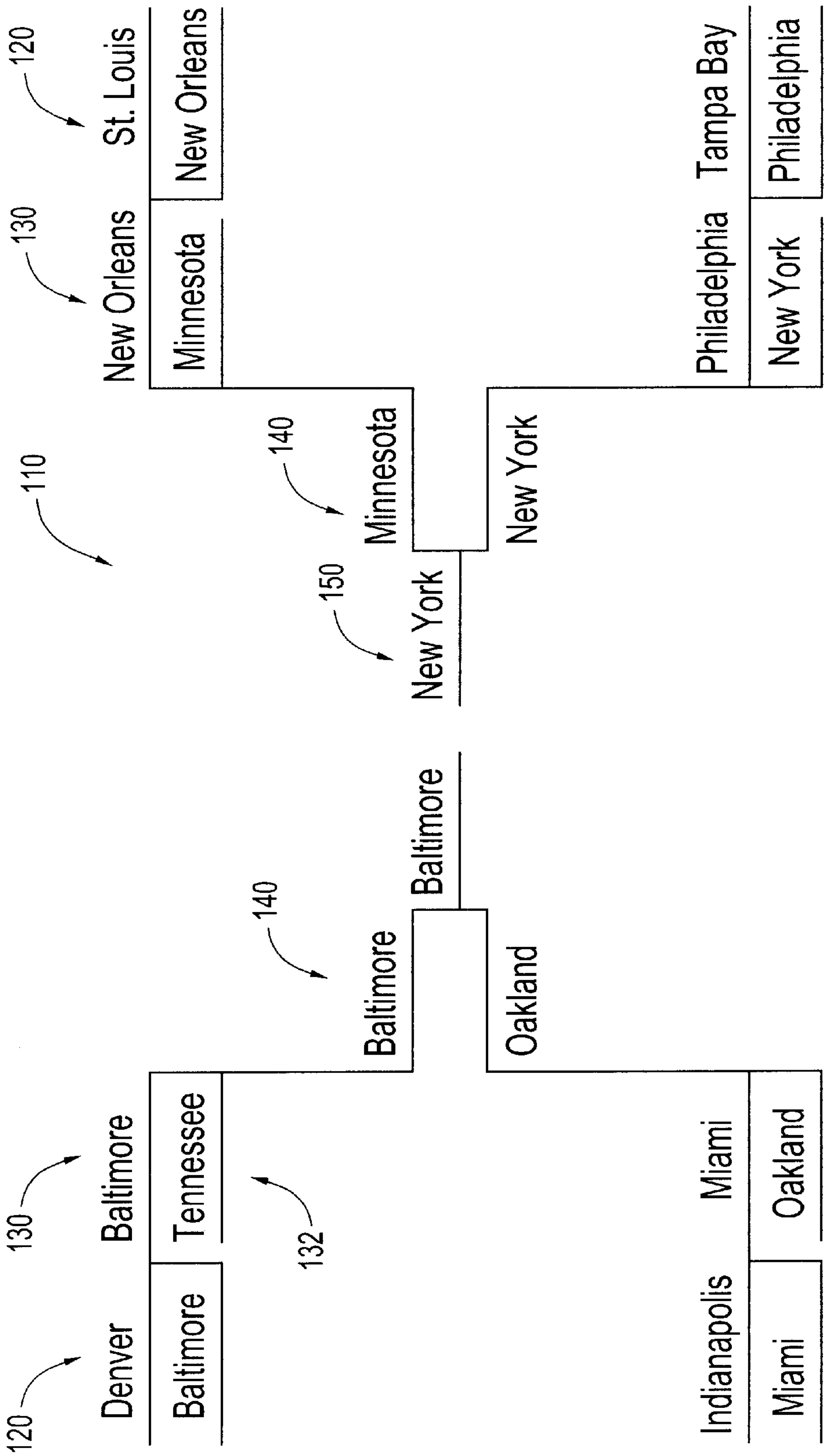
FIG. 3 depicts a hypothetical chart showing the initial field for the NFL playoffs, along with an individual's picks from the field of the playoffs.

Turning to FIG. 1 to FIG. 3, FIG. 1 depicts a hypothetical example of the NCAA™ Division I college basketball tournament chart 10 which has been filled out by a game participant with a winning team selected for each game of each round. As depicted in FIG. 1, the first game in the Western division of the tournament is between Arizona and Jackson State, and Arizona is picked to win the game 20. In the next game in the bracket, the second round, Wisconsin is picked to beat Arizona 22. In the third and fourth rounds, Wisconsin is also picked to defeat LSU 24 and Purdue 26, respectively, until finally losing to Michigan State 28 (abbreviated Mich. St.) in the semi-final round. This chart also lists Michigan State 30 as defeating Florida in the NCAA™ final round. Each of the teams is initially assigned a "seed" 32, their place in the tournament which generally corresponds to their probability of winning the tournament. In FIG. 1, Arizona 34 is listed as the number 1 seed in their bracket, while their Round One opponent Jackson State 34 is given the number 16 seed.

By completely filling out this chart 10, the game's participants predict the winning teams for the entire ongoing tournament prior to the tournament's start, and record these predictions in an easy to read form. For the NCAA™ tournament these charts on brackets are typically published in magazines and newspapers nationwide, and have become standardized for the tournament.

After completion of Round One (40) of the tournament, 32 of the 64 teams are eliminated from the competition. The individual participants would have predicted the outcome of each game with varying degrees of success. In one embodiment of the invention, the points for each correct winning prediction would be calculated as follows. Each winning team in Round One (40) would be worth two points, plus a number of points equal to their seed. Thus, participants would be rewarded for successfully predicting an upset. For example, if a participant correctly predicted that the 16th seed in the West, Jackson State 36, would defeat the top seed Arizona 34, the participant would receive 2 points plus 16 points, for a total of 18 points for the given game in that round of the tournament 81. These points would be totaled for all of the games individual participants pick correctly in the ongoing tournament.

At this point, some of the participants may have chosen poorly, and lost many of their initially picked teams. To prevent such participants from losing interest in the game, as depicted in FIG. 2A, all of the participants are allowed to make eight trades 82. As used herein, a trade is defined as an exchange of a picked team which may or may not have lost in the preceding round, for a team which the participant had not picked. Should the newly picked team win in the following round, the participant earns points from the round as if from any similarly seeded team in the round. However, to retain the team in still later rounds, the participant will be required to use additional trades in those rounds. For example, if a participant wished improve their picks in the second round, he or she could trade Dayton 38, which lost, for Gonzaga 42, which won. See FIG. 1. However, to retain Gonzaga 42 for still later Round Three, the participant would be required to use an additional trade. It is recognized that in still further embodiments, the traded team could be retained by the participant in all rounds, after the initial trade.

In the embodiment depicted in FIGS. 2A, 2B, and 2C while only eight trades are allowed following Round One, a participant need not make all, or even any, of the trades available, nor are trades limited to exchanging the loser of a game for the winner of the game, nor are they confined to the individual conference bracket. However, it is recognized that the invention covers the use of additional trades or fewer trades, to allow for the number of teams competing in the tournament and the number of rounds in the tournament.

At Round Two (44), the field of 32 teams is again reduced by half to 16 teams. In FIG. 2A, the winning picks are defined to be worth 4 points plus their seeding number 84. For example, correctly picking 10th seeded Gonzaga 42 to win at this round would be worth 4 points plus 10 seeding points, for a total of 14 points (see FIG. 2A). Again, the points are totaled and each participant would then be allowed to make a set number of trades. In the embodiment depicted, participants would be allowed to make 4 trades, with the same conditions as the previous round.

At Round Three (46), the field of 16 teams is reduced by half to 8 teams. The winning picks are worth 8 points, plus their seeding number 86. For example, correctly picking Purdue to reach this Round of the tournament would be worth 8 points plus 6 seeding points, for a total of 14 points. Again, the points would be totaled for the individual participants, and a limited number of trades would then be allowed. In the embodiment depicted, the participants would be allowed to make 2 trades 87, under the same terms and conditions as the previous round.

At Round Four (48), the field of 8 teams is reduced by half to 4 teams, also known as the Final Four™ in the NCAA™ Tournament. As depicted in FIG. 2B, the winning picks are worth 12 points each, plus their seeding number 88. For example, picking Wisconsin 26 to reach the Final Four™ would be worth 12 points plus 8 seeding points, for a total of 20 points. Again, the points would be totaled for the individual participants, and participants would be allowed to make one trade, with the same terms as the previous round. By allowing at least one trade 90 at this late round, even a participant who has failed to chose one final four team in the earlier rounds would be able to trade for a Final Four™ team, and thus maintain their interest in the game. Also, the seed-based points allow players to obtain increased points for their underdog picks, especially in later rounds. This and the point increase also provide for increased participant interest in the later rounds of the fantasy game.

At Round Five (50), the semi-finals, the field of four teams is reduced by half, and only the championship game remains. As depicted in FIG. 2B, the winning picks to make it to the finals are worth 16 points each, plus the teams seeding points 94. Thus, correctly picking Florida 52 would be worth 16 points plus 5 seeding points, for a total of 21 points. As depicted in FIG. 2C, at this point, no more trading is allowed 96, at least in this embodiment of the game.

At Round Six (56), the finals, the winner becomes the NCAA™ Division I basketball champion. As depicted in FIG. 2B, the winning pick for the championship game is worth 20 points, plus the teams seeding points 100. Thus, correctly picking Michigan State to be the NCAA™ champion is only worth 20 points plus 1 seeding point, for a total of 21 points.

At this point in the Fantasy game, bonus points may also be awarded to participants who made the fewest trades during the tournament. The instant embodiment awards 25 points to all participants who make no trades throughout the tournament. It is recognized that, depending on the number and skill of the participants, this bonus may be increased, decreased or eliminated without departing from the spirit and scope of the invention. Each participant's points are totaled for a final tally, and the winner is the participant with the most points.

However, a tie between participants is entirely possible at this point. To decide the winner in this case, a number of tie breaking rules may be applied. First, the participant with the fewest number of trades could be deemed the winner. If participants are still tied, additional tie breaking rules may also be applied. In the instant embodiment, the participant who has the highest total number of correct picks would be deemed the winner. An additional tie-breaker rule is also that the individual who makes the closest guess of the score of the championship game is deemed the winner.

In FIG. 3, the NFL™ playoffs 110 are shown as a bracketed tournament to demonstrate the versatility of the current game method and engine. By reducing the number of rounds in the game engine and method, as well as by using fewer of the trades allowed per round, the game engine and method may be adapted to this tournament.

In this embodiment, the engine and method are used in four rounds, Round One 120, Round Two 130, Round Three 140, and Round Four 150 the championship round known as the Superbowl. Round One 120 determines only one of the teams playing in Round Two 130. The other team in Round Two had already earned its place in Round Two by having a generally better record than the teams playing in Round One. This arrangement is commonly referred to as a "bye." Here, Tennessee 132 has earned a bye, and does not play in Round One. Thus, participants pick only one team in Round Two, but two teams in each series of games in Round Three and Round Four. Since there are fewer teams initially, there are fewer picks needed to fill in the NFL bracket 110, and fewer trades are thus needed to increase participant interest in this fantasy game compared with the NCAA tournament fantasy game. By allowing two trades after Round One, and two trades in Round Two, participants are provided with an increased chance having a team in the final championship round, thus having increased interest for the entire ongoing tournament fantasy game.

Figure 4:
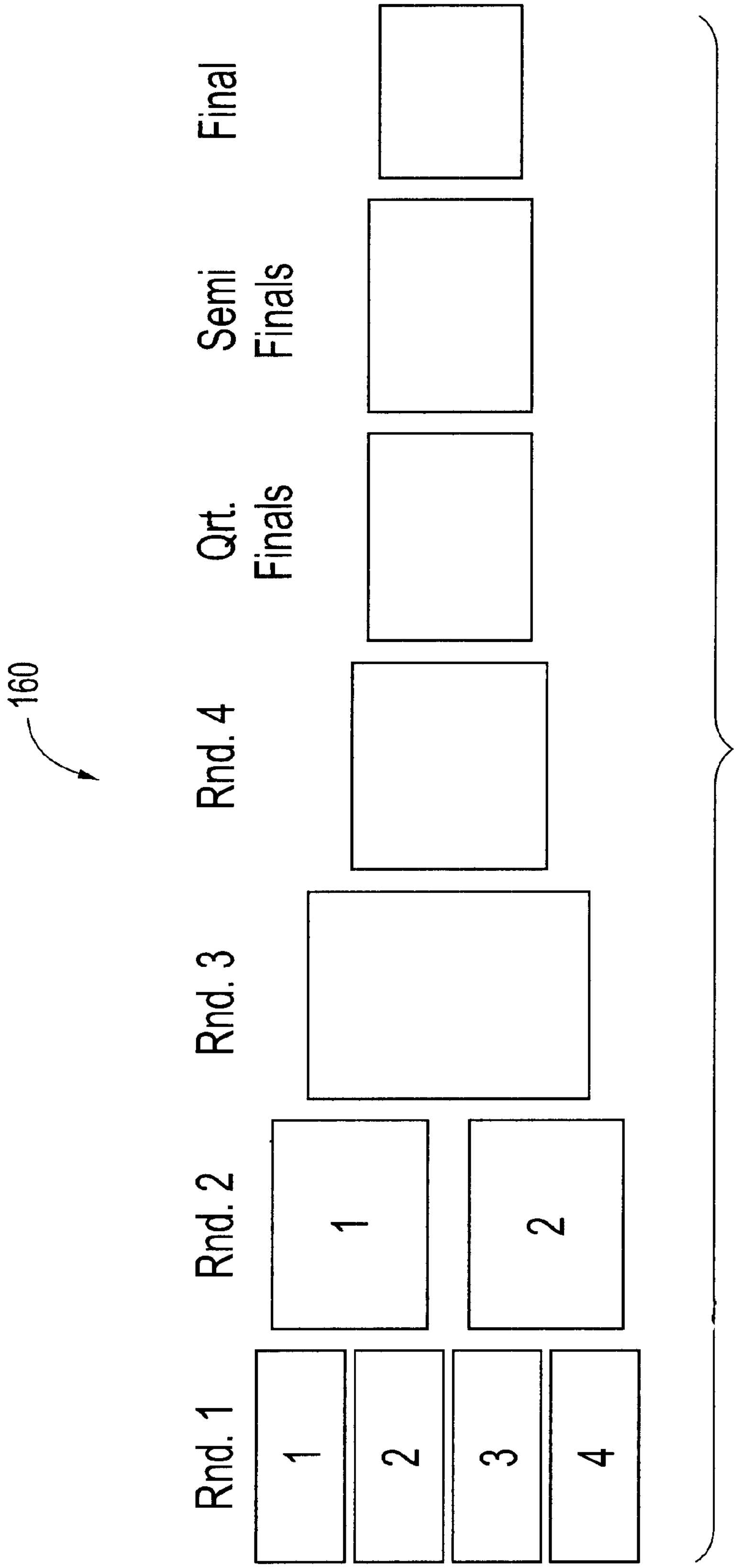
FIG. 4 depicts a hypothetical chart showing, in block form, the rounds of a tennis open tournament.

A contrasting situation is shown in FIG. 4 (10), the Australian Tennis Open 160. In this ongoing tournament, the number of players competing is far larger than the number of teams in the NCAA tournament, as well as additional Rounds in the ongoing tournament. In this situation, the number of trades may be increased and the number of rounds where trading is allowed extended in order to increase participant's interest in the fantasy game.

The many features and advantages of the invention are apparent from the detailed specification, and thus, it is intended by the appended claims to cover all such features and advantages of the invention which fall within the spirit and scope of the invention. The foregoing description is intended to be illustrative of the invention, and is not intended to contain or imply limitations thereupon. Also, although numerous modifications and variations will readily occur to those skilled in the art, it is not desired to limit the invention to the exact method and operation illustrated and described, and accordingly, all suitable modifications and equivalents may be resorted to, falling within the scope of the invention.

What is claimed is:

1. A fantasy sports game method, comprising the steps of:

a. selecting a plurality of competitors from the field of sports tournaments;

b. determining a result of the tournament on completion of a round of the tournament;

c. calculating a point total from a base number and a seed number for the fantasy game participant based on the results of the round of competition;

d. allowing a number of trades of the eliminated competitors for remaining competitors;

e. repeating steps b–c until the ongoing tournament ends; and f. determining the winner of the fantasy sports game, g. wherein said base number increases with each round of the tournament.

2. The method of claim 1, wherein determining a result of the ongoing tournament includes the step of determining a set of remaining competitors and a set of eliminated competitors, and the step of trading eliminated competitors is limited to a number less than the total number of remaining competitors.

3. The method of claim 2, wherein the step of allowing a number of trades is limited to fewer rounds than the total number of rounds of the ongoing tournament.

4. The method of claim 1, further comprising the step of reducing the number of trades allowed with each succeeding round of the tournament.

5. The method of claim 1, further comprising the step of assigning the competitors a dollar value based on their respective odds of winning the round of the tournament, and calculating the point total for individual playing the fantasy game participant based on said dollar value.

6. The method of claim 1, wherein the number of competitors in the field of the tournament is 64, the number of trades allowed in the first round of the tournament is 8, and, in successive rounds of the tournament, the number of trades is reduced in each round.

7. The method of claim 1, wherein the ongoing tournament is the NCAATM tournament.

8. The method of claim 1, wherein the ongoing tournament is the NFLTM tournament.

9. The method of claim 1, wherein the step of selecting a plurality of competitors is performed by a player accessing a file on a computer.

10. The method of claim 1, wherein the steps of determining the result of the tournament; calculating a point total are performed using a series of software commands, and allowing a number of trades are performed using a software program.

11. A method of conducting a fantasy sports game for individual fantasy game participants based on an ongoing tournament of competitors, comprising the steps of:

a. selecting a plurality of competitors from the field of the tournament;

b. determining a result of the tournament on completion of a round of the ongoing tournament, based upon the remaining competitors in the field of the tournament and the eliminated competitors from the field of the tournament;

c. calculating a point total for the fantasy game participant based on the results of the round of competition;

d. allowing a number of trades of the eliminated competitors for remaining competitors;

e. repeating steps b–c until the ongoing tournament ends; and f. determining the winner of the fantasy sports game;

wherein calculating said point total for the fantasy game participant includes assigning a value for an individual team in the field, said value based upon a seeding of said individual team winning the next successive round of the tournament, and, for the set of winning teams selected, adding said values to the point total; and said number of trades is limited to number less than the total number of remaining competitors, and said number of trades allowed in an each successive round of the tournament is reduced with each successive round.

12. The method of claim 11 wherein steps b–f are performed using a program running on an Internet server.

13. The method of claim 12, wherein step a is performed using a computer with access to an Internet server.

* * * * *